May 27, 1952 W. C. DAVIS 2,598,038
PROCESS FOR TREATING WHALE GLUEWATER
Filed June 3, 1950 2 SHEETS—SHEET 1
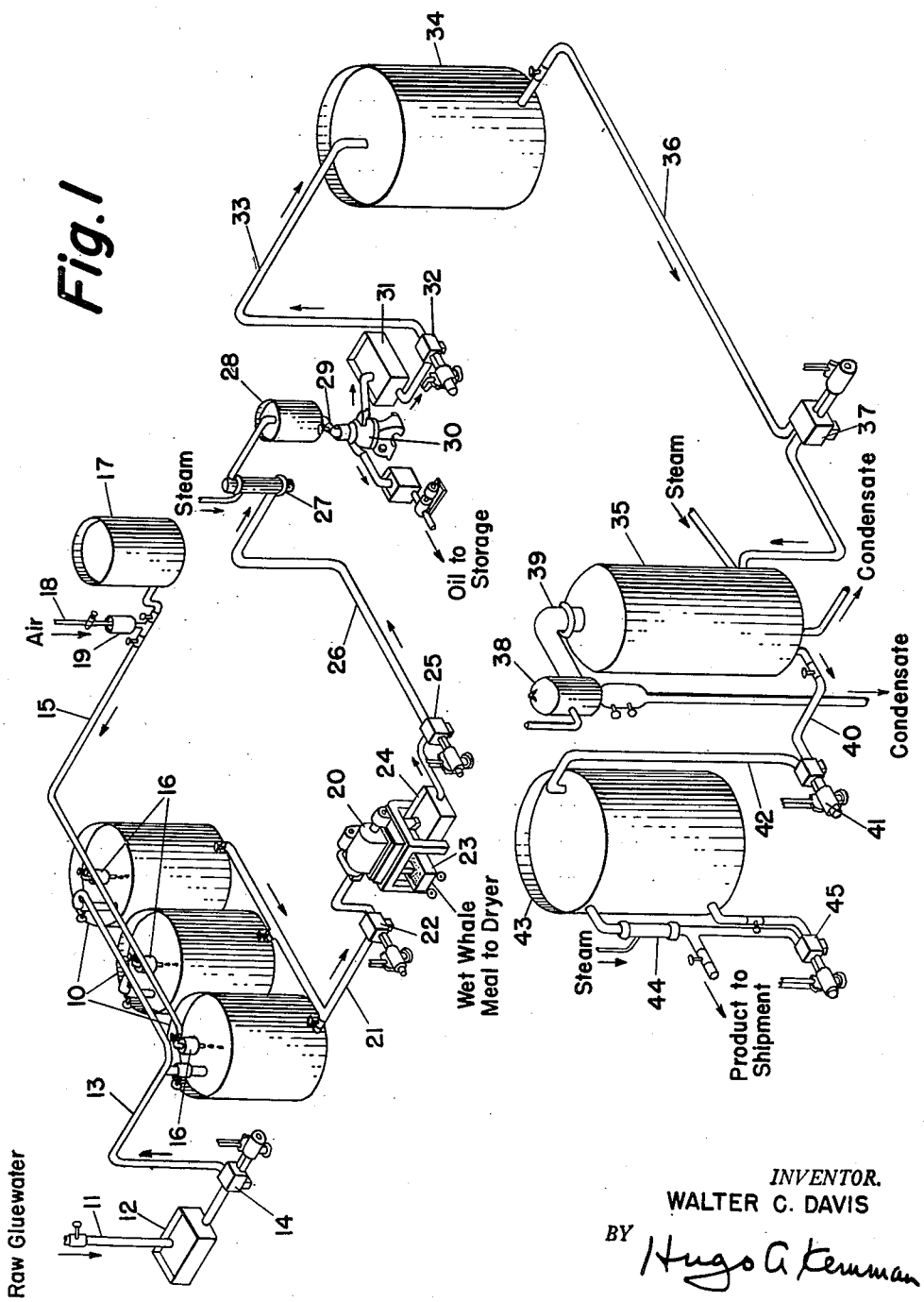
INVENTOR.
WALTER C. DAVIS
BY Hugo G. Kennman
ATTORNEY

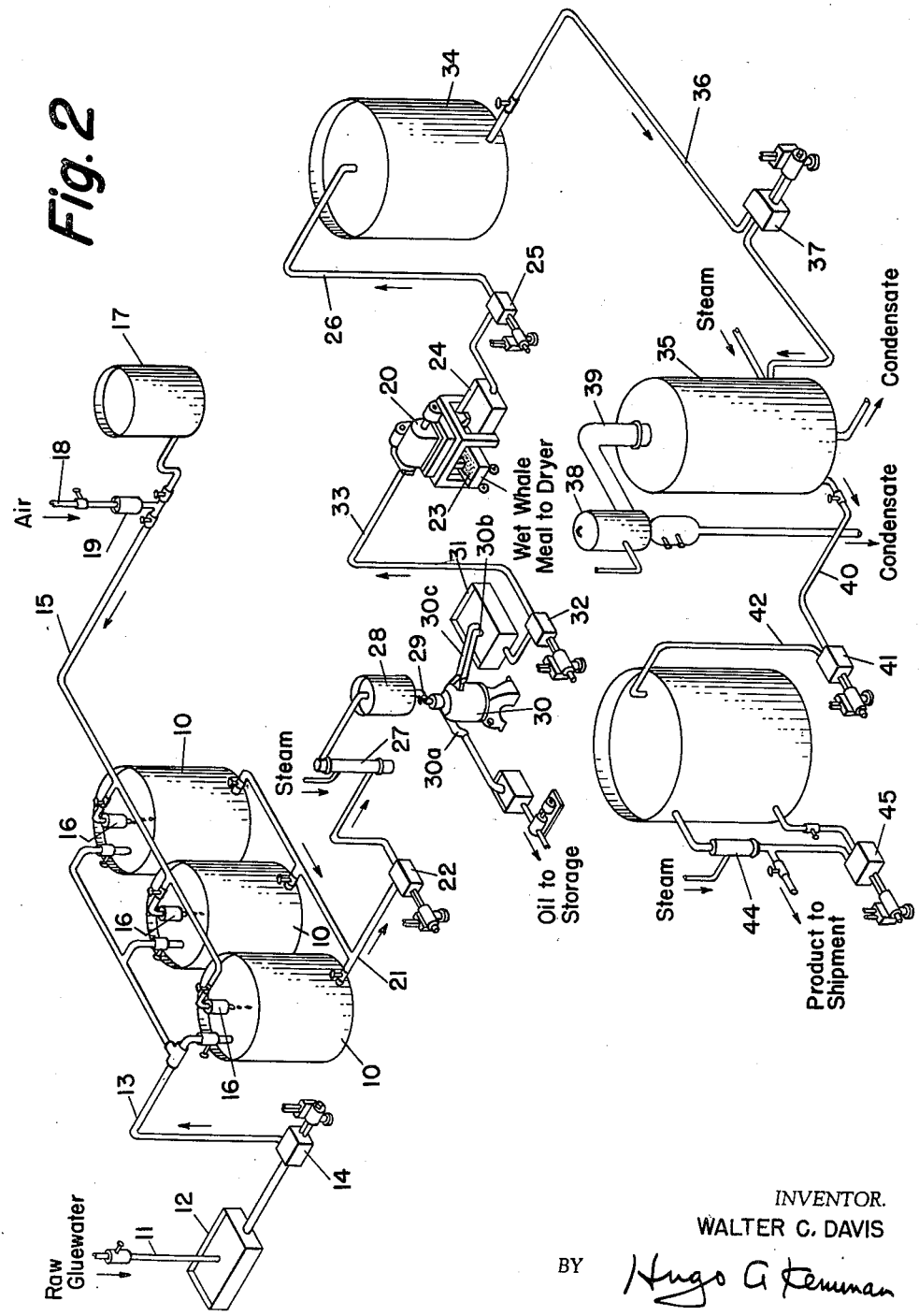

Patented May 27, 1952

2,598,038

UNITED STATES PATENT OFFICE 2,598,038

PROCESS FOR TREATING WHALE GLUE WATER

Walter C. Davis, Tredyffrin Township, Chester County, Pa., assignor to The Sharples Corporation, a corporation of Delaware Application June 3, 1950, Serial No. 166,028
In Norway August 30, 1949

11 Claims. (Cl. 260—112)

This invention relates to the treatment of digestor liquor, or gluewater, produced as a byproduct in the manufacture of whale oil and meal, and relates more particularly to a process for the treatment of such liquor for the recovery of valuable products therefrom.

In the processing of whales, the whale is usually segregated into blubber, carcass, and lean meat, and bone. The segregated materials are treated to produce oil, meal and gluewater by methods well known in the art.

The term gluewater is applied herein to the predominantly aqueous liquors produced in the processing of the blubber, carcass, lean meat and bone, or any other parts of whales, either separately or together in any combination process.

Gluewater, whether produced from the whale, or any parts thereof, is relatively stable at temperatures above about 180° F., but rapidly decomposes at temperatures below about 100° F., to give off extremely foul and noxious odors. Because of this characteristic, and the prevalence of a greater density differential between oil and water at higher temperatures, the gluewater is usually settled and skimmed, or centrifuged, at elevated temperatures to recover most of the entrained oil, and is then promptly sent to waste, although attempts have been made to utilize it.

I have discovered a method by which gluewater can be stabilized and conveniently processed to produce valuable products. I have found that gluewater, which contains some suspended solids and oil, in addition to appreciable amounts of dissolved proteinaceous material, can be stabilized and treated to recover the suspended solids, the suspended oil, and the dissolved proteinaceous material, in the form of valuable, stable products which do not give off foul odors, even after prolonged periods of time.

I have discovered that by the addition of an acidic material to gluewater in sufficient amount to reduce the pH of said gluewater to a value within the range of about 4 to 5, and preferably 4 to 4.5, while the temperature of the gluewater is maintained at at least 180° F. and preferably about 185° F., the suspended solid and oily materials are caused to separate from suspension. These separated solids coagulate or agglomerate, and tend to settle, while the separated oil tends to float to the surface. At the same time a portion of the dissolved proteinaceous material is thus caused to separate from solution. This separated proteinaceous material coagulates or agglomerates, and tends to settle. As a result, decomposition of proteins and amino acids, both in the gluewater and in the coagulated or agglomerated solids, and loss in potency of vitamins, both in the gluewater and in such solids are very materially reduced or prevented.

After causing the coagulation or agglomeration of the separated solid proteinaceous material in the acidified gluewater to go to substantial completion, and causing at least a substantial part of the proteinaceous material, and particularly that remaining in the gluewater, to hydrolyze, the acidified mixture is passed to and through a centrifuge, or any other suitable device adapted to separate and remove solids and/or oil from the acidified gluewater. Depending upon the separating device, this may accomplish both the separation of released oil and of solids. However, I prefer to separate the oil from the treated gluewater, either before or after separation of the solids. The individual separation of solids and oil permits the use of centrifuges individually adapted to the efficient separation of either solids or oil as the case may be, though some of the other of the two may be separated as a separate phase in the same operation.

I have discovered that whale gluewater so processed, and which is now substantially free of suspended solids and oil, is stable against putrefaction. I also have found that whale gluewater so processed contains appreciable amounts of proteins, amino acids, vitamins, and other material having high nutritional value.

I next concentrate this clarified gluewater by a suitable procedure, such as by subjecting it to evaporation.

Considering the foregoing in greater detail, the raw material, which may consist of cut sections of whole whales, or certain parts of whales, such as blubber, carcass, meat and/or bones, is cooked or digested in a suitable digester or cooker, by conventional methods well known in the art, to produce a hot mixture of undissolved solids, oil, and water containing suspended and dissolved material. This hot mixture is usually passed through a screen or centrifuge before it is collected in a settling tank for subsequent processing to remove undissolved solids and oil by well known, conventional methods.

The hot digestor liquor, after the removal of readily removable undissolved solids and oil, is still at an elevated temperature, for example, about 210° F., or above, and usually still contains appreciable quantities of oil which may be removed by additional settling at this elevated temperature. The oil rises to the surface of the liquor in the settling tank and may be withdrawn by skimming. Alternatively, the hot digestor liquor may be passed through a centrifuge adapted to separate oil from the aqueous phase. But irrespective of the method employed for the initial separation of solids and oil from the gluewater, it is now ready for processing in accordance with this invention.

Referring to Figure 1 of the schematic drawings, the hot gluewater is now transferred to one of a plurality of acidulation tanks 10 through conduit 11, catch tank 12, and conduit 13 by means of pump 14. The required amount of acidic treating agent, such as sulfuric acid, for example, is fed continuously into admixture with the incoming stream of gluewater as the tank 10 is being filled, through valved conduit 15 and a drip tank 16, from treating agent storage tank 17. This is accomplished by applying air pressure through valved conduit 18 to treating agent measuring tank 19, after charging tank 19 with a measured amount of treating agent. The treating agent is preferably introduced into the gluewater in the acidulation tank at a slow, steady rate to avoid any local over-acidulation which might tend to injure the color of the subsequently removed oil. Sufficient treating agent is added to the gluewater to reduce the pH thereof down to between 4 and 5, and preferably down to between 4 and 4.5, such as, down to 4.2.

After the acidulation tank 10 is filled, and the pH is properly adjusted, the tank 10 is maintained substantially static at a minimum temperature of 180° F. for at least approximately fifteen minutes, such as, for example, thirty minutes to permit coagulation or agglomeration of suspended colloidal proteins, and of proteinaceous enzymes thus thrown out of solution in the gluewater, as well as to cause, due to the particularly described temperature and pH conditions applied, substantial hydrolysis of protein material present, particularly in the gluewater. (During this period the material in one or more of the other tanks 10 is placed on stream for further processing as hereinafter described, and at the end of such processing the tank is recharged with untreated gluewater and treating agent as described above.) The maintenance of the elevated temperature and reduced pH conditions described prevents proteolysis by the enzymes, and causes the desired chemical and physical changes which lead to a treated gluewater, which upon being subjected to evaporation, yields a highly valuable concentrated product to be hereinafter more particularly described.

The proteins thus coagulated or agglomerated have been found to be the ones which decompose in the gluewater. By adjustment of pH and temperature as above described, these objectionable proteins, including proteinaceous enzymes originally in solution in the gluewater, are coagulated or agglomerated, and further enzymolysis of proteins present, in either the liquid or solid phase, is immediately arrested or inhibited. The proteins remaining in solution are recovered as condensed whale solubles, as will be described below. At this point dissolved proteins represent, for example, about 15 percent by weight of the gluewater.

Although I prefer to use sulfuric acid as the treating agent, I can use other chemicals adapted to reduce the pH of the gluewater down to from 4 to 5, such as aluminum sulfate, any of the alums, ferric chloride, tannic acid, etc. In general, substances of definitely acidic nature are suitable reagents for this step.

The necessary amount of treating agent is added to obtain the desired pH. When using aluminum sulfate, for example, usually from one-quarter of one percent to one percent will suffice. The pH of the gluewater is a useful criterion in determining when sufficient sulfuric acid, aluminum sulfate or other treating agent has been added. The original pH of the gluewater is usually about 6.3 to 6.8, or slightly below. The untreated gluewater comprises a slightly acidic aqueous mixture containing suspended oil of lower density than the water phase, and suspended proteinaceous material of slightly greater density than the water phase. The droplets of suspended oil in the original gluewater are evidently stabilized, or tightly adsorbed on colloidal proteinaceous material to such an extent that they are not separated from the liquor by settling, or even by centrifuging. As a result of my treatment of the gluewater, the oil is freed, and colloidal proteinaceous material is coagulated or agglomerated.

The oil liberated in the treated gluewater by the action of the treating agent under the conditions described is susceptible to various gravitational separatory operations, such as settling or centrifuging. The coagulated or agglomerated proteins may also be removed by centrifuging or settling at the same time that the oil is removed, provided equipment adapted to efficiently separate heavy, intermediate, and light density materials as three separate phases is employed. However, I prefer to first remove either the oil or the coagulated or agglomerated proteins, the latter together with any previously incompletely separated meal.

Referring again to Figure 1 of the drawings, initial removal of solids is illustrated as accomplished by passing the hot mixture from the acidulation tank 10 into a continuous sludge discharge, horizontal-type, clarifying centrifuge 20 at a controlled rate, by means of conduit 21 and pump 22. The solids are continuously separated in centrifuge 20 and are discharged into a cart 23. Usually, these solids are then passed through a dryer (not shown). The resulting dried solids are high in riboflavin and B complex vitamins originally present, these vitamins having been largely preserved as the result of my treatment. They usually analyze from about 75 to 85 percent protein, depending upon the raw material originally used.

Although limited amounts of solids, for example, from 2 to 3 percent of the gluewater treated, are recovered in this step, removal of these solids under the conditions of treatment described is vitally important because such removal increases greatly the value of the final condensed soluble material to be described hereinafter.

If these solids are not caused to separate under the conditions of treatment from the gluewater, their presence in whole or in substantial part in the final concentrated gluewater imparts to it a strong undesirable odor, and makes the condensed gluewater susceptible to decomposition. Furthermore, removal of these solids prior to evaporation greatly increases the operating efficiency of the evaporators in the evaporation stage which is to be described below. If these solids, or any substantial part thereof, remain in the feed to the evaporators, not only is the final product so highly viscous that it cannot be handled as a liquid, but also serious incrustation of the evaporator tubes takes place in a matter of hours. With these solids removed under the conditions of treatment described, the concentrated product can be handled as a liquid, and the evaporators can be operated without loss in operating efficiency for a period of thirty days or more before cleaning becomes necessary.

Also of outstanding importance is the fact that, by the practice of my invention, the final concentrated product is obtained in a stable form having a smooth texture, and which does not separate into layers on standing. This not only avoids the necessity of remixing prior to use, but also shows substantial hydrolysis of the proteins present. Since hydrolyzed protein is much more easily digestible, the result is that a highly nutritive product is obtained. Under the conditions of treatment, the residual oil in the final concentrated product is very considerably reduced, and is well below that quantity which would be harmful if present in products fed to chickens and hogs or other animals. Moreover, and as pointed out above, the final concentrated product is unusually stable against bacterial decomposition, and is not of such high viscosity that it cannot be handled as a liquid, particularly upon slight warming.

Returning now to Figure 1 of the drawings, the liquid component of the acidulated mixture is discharged from centrifuge 20 into catch tank 24, and is transferred by means of pump 25 through conduit 26 and heater 27 into feed tank 28. In passing through heater 27 and into feed tank 28, the temperature of the gluewater is preferably raised above 200° F., such as, to about 210° F. in order to reduce the viscosity of the oil and ease separation thereof from the aqueous phase and the small amount of very fine residual solids usually present. The hot gluewater is then fed, at a controlled rate, through valved conduit 29, to a centrifuge 30 which is adapted to skim or remove a lower density liquid from a higher density liquid. In centrifuge 30 the lower density oil is separated from the higher density aqueous portion of the charge liquid, and is transferred to an oil storage tank (not shown). For the purpose of making this separation, I prefer to use a continuous, three phase nozzle-discharge type centrifuge, residual solids and part of the gluewater comprising the third phase. This assists in clarifying the oil of very fine insoluble solid residues usually present in the gluewater.

The amount of oil recovered at this stage depends upon the efficiency of the primary separation of oil from the gluewater. Generally speaking, all oil in excess of about 0.10 percent in the feed to centrifuge 30 is recovered at this point—this usually amounts to about a 5 to 10 per cent overall increase in the amount of oil recovered in the entire process.

If the oil is not removed, it will contaminate the final condensed solubles product with reduction in its quality because oil reduces the nutritional value of the condensed solubles. Furthermore, the presence of excess oil in the charge solution to the evaporator leads to reduction in thermal efficiency. There is a tendency for the oil to adhere to the evaporator tubes and to form incrustations on the tubes in combination with the small amount of very fine insoluble residues usually remaining in the gluewater charged.

The gluewater discharged from centrifuge 30 usually has the appearance of a milky liquor which displays substantially no tendency toward enzymolysis or putrefaction. If the gluewater is discharged in more than one stream, the streams are usually combined for further processing, it being unnecessary to remove the small amount of very fine insoluble residues present, in view of the low oil content of the gluewater. The acidulated gluewater at this point usually contains around approximately 15 percent of total solids.

The acidulated gluewater is now in proper condition for concentration, and is preferably evaporated in a suitable apparatus, such as a forced circulation vertical tube type evaporator. The gluewater discharged from centrifuge 30 into catch tank 31, is transferred by means of pump 32 through conduit 33 into acidulated gluewater storage tank 34. From tank 34 the acidulated gluewater is charged to evaporator 35 through valved conduit 36 by means of pump 37. The pressure in the evaporator 35 is reduced by means of barometric condenser 38, and evaporation is carried out to the desired degree by drawing off water vapor through conduit 39. The concentrated product is withdrawn from evaporator 35 through valved conduit 40, and is transferred by means of pump 41 and conduit 42 to condensed product storage tank 43. Tank 43 is provided with a heater 44 and a pump 45 for circulation and warming of the condensed product in tank 43, particularly in cold weather, to lower its viscosity, thus maintaining it in readily flowable condition.

The degree of evaporation effected usually depends upon the use to which the condensed product is to be put, and upon its particular flow characteristics which may vary somewhat with different gluewaters. In general, the gluewater is evaporated to a total solids content of about 50–60 percent.

Because of the particular conditions of treatment applied, the whale soluble materials in the concentrated product contain large amounts of vitamins, such as, vitamin B-complex, animal growth-promoting factors, amino acids, mineral salts and various hormones.

In Figure 2 of the drawings, wherein like parts bear like reference numerals, removal of oil prior to the removal of solids is illustrated. The essential difference between Figure 2 and Figure 1 of the drawings is that in Figure 2 the positions of centrifuges 20 and 30 together with their appurtenances have been interchanged.

Thus in Figure 2 pump 22 feeds through heater 27 into feed tank 28 for centrifuge 30. In passing through heater 27, the temperature of the gluewater is raised, if not already of a desired temperature, such as to above 200° F., in order to reduce the viscosity of the oil and facilitate separation thereof from the aqueous phase, and the coagulated or agglomerated solids present. In this operation a continuous three phase nozzle-discharge type centrifuge is very useful.

As illustrated, oil is discharged from centrifuge 30 at 30a, gluewater at 30b and solids with gluewater at 30c. Substantially the same efficiency in oil separation is obtained as in Figure 1.

Although the two gluewater-containing streams may be processed separately, if desired, (and the same applies in Fig. 1) I usually prefer, particularly when employing a nozzle-discharge type centrifuge, to combine them in catch tank 31, from which the combined streams are pumped through conduit 33 by pump 32 into centrifuge 20.

In centrifuge 20 solids are separated from the gluewater in the same manner as previously described in connection with Figure 1, and the gluewater is fed into tank 34 by pump 25 through conduit 26, for further processing in the same manner as already described in connection with Figure 1.

In view of the heat supplied at 27, it is rarely necessary to reheat the gluewater-solids mixture fed to centrifuge 20 from catch tank 31 to maintain it at a temperature above 180° F. However, heating may be resorted to if necessary or desirable.

The products obtained in Figure 2 are of the same quality as those obtained in Figure 1.

The following specific examples are by way of illustration and not of limitation.

*Example 1*

Gluewater obtained from the digestion of sperm whale contained 2.0 percent solid undissolved material, 0.30 percent oil, and 14.0 percent solid dissolved material. A 10,000 pound portion of this gluewater, at a temperature of 200° F., was acidulated to a pH of 4.5 to 5.0 by addition of 52 pounds of 66° Bé. sulfuric acid. The acidulated gluewater was maintained static at a temperature of 200° F. for thirty minutes.

The hot gluewater was then passed through a continuous sludge discharge, horizontal-type clarifying centrifuge which reduced the undissolved solids content of the acidulated gluewater to 1.1 percent by weight, and removed 295 pounds of wet whale meal containing 58 percent moisture and 1.0 percent oil on the wet basis. The clarified, acidulated gluewater contained 0.28 percent oil and 14.0 percent dissolved solid material.

The clarified, acidulated gluewater was reheated to 200° F. and was passed through a continuous three phase, nozzle discharge type centrifuge of well-known design which reduced the oil content of the acidulated gluewater to 0.08 percent and removed 20 pounds of oil. The oil was of good quality and was sent to storage.

The gluewater then was evaporated to produce approximately 6,755 pounds of vapor condensate and 2,950 pounds of condensed product containing 50 percent by weight of total solids.

*Example 2*

Gluewater obtained from the digestion of blue whale contained 1.64 percent solid undissolved material, 3.4 percent oil, and 14.4 percent solid dissolved material. A 35,000 pound portion of this gluewater, at a temperature of 205° F. was acidulated to a pH of 4.2 by the addition of 240 pounds of 66° Bé. sulfuric acid. The acidulated gluewater was maintained static at a temperature of 205° F. for thirty minutes.

The hot gluewater was then passed through a continuous sludge discharge, horizontal-type clarifying centrifuge which reduced the undissolved solids content of the acidulated gluewater to 0.96 percent by weight, and removed 940 pounds of wet whale meal containing 62 percent moisture and 1.1 percent oil on the wet basis. The clarified, acidulated gluewater contained 3.45 percent oil and 14.5 percent dissolved solid material.

The clarified, acidulated gluewater was reheated to 200° F. and was passed through a continuous three phase, nozzle discharge type centrifuge of well-known design which reduced the oil content of the acidulated gluewater to 0.5 percent and removed 1010 pounds of oil. The oil was of good quality and was sent to storage.

The gluewater then was evaporated to produce approximately 22,250 pounds of vapor condensate and 10,800 pounds of condensed product containing 50.3 percent by weight of total solids.

*Example 3*

Gluewater obtained from the digestion of fin whale contained 4.5 percent solid undissolved material, 4.3 percent oil, and 16.1 percent solid dissolved material. An 87,000 pound portion of this gluewater, at a temperature of 200° F. was acidulated to a pH of 4.0 by the addition of 750 pounds of 66° Bé. sulfuric acid. The acidulated gluewater was maintained static at a temperature of 200° F. for thirty minutes.

The hot gluewater was then passed through a continuous three phase, nozzle discharge type centrifuge of well-known design which reduced the oil content of the acidulated gluewater to 0.7 percent and removed 3130 pounds of oil. The oil was of good quality and was sent to storage.

The gluewater contained 4.6 percent solid undissolved material and 16.5 percent solid dissolved material was then passed at a temperature of 200° F. through a continuous sludge discharge, horizontal-type clarifying centrifuge which reduced the undissolved solids content of the acidulated gluewater to 1.3 percent by weight and removed 14,600 pounds of wet whale meal containing 66 percent moisture and 1.0 percent oil on the wet basis. The clarified gluewater contained 0.66 percent oil and 17.4 percent dissolved solid material.

The gluewater was then evaporated to produce approximately 43,000 pounds of vapor condensate and 27,000 pounds of condensed product containing 50 percent by weight of total solids.

While in the foregoing particular description reference has been made to certain types of centrifuges for making the desired separations referred to, it is to be understood that any other type or types of centrifuges suitable for the purpose, or other suitable separation devices, may be employed.

Continuous sludge discharge, horizontal-type, clarifying centrifuges, particularly referred to above, are well known in the art, for instance see Figure 5 in an article by Mr. C. M. Ambler, entitled "New developments in centrifuge applications," appearing in "Chemical Engineering Progress" for May, 1948, pages 405 to 410. In Figure 3 is shown a continuous three-phase nozzle-discharge type centrifuge, which type of centrifuge also has been particularly referred to above. Other centrifuges referred to in this article might be employed in practicing the invention, for example, the valve discharge centrifuge illustrated in Figure 4. A centrifuge of the latter type is described and claimed in U. S. Patent 2,286,354, by Harold C. Fitzsimmons. A valve discharge centrifuge may be employed for separating solids, gluewater and oil in a single operation, or for the separation of solids from a mixture of gluewater and oil, or from the gluewater after separation of the oil. Other types of centrifuge construction useful in carrying out the invention will suggest themselves to persons skilled in the art upon becoming familiar with this invention.

In carrying out this invention, it is preferred that the gluewater from the time of its production (preferably while still in contact with the whale) to the time of its acidulation to reduce its pH to between 4 and 5, be maintained under temperature conditions above 180° F. This also applies to the static holding period in tank 10, and to the centrifugal separation steps, the latter to facilitate separation. It is also preferred that gluewater be processed within a short time after its production and initial separation from solids and oil.

The initial separation of oil from the gluewater by conventional processes usually reduces the oil content of the gluewater to below 3 percent by weight, and frequently below 2 percent by weight. When the gluewater contains substantially larger quantities of oil, the procedure illustrated in connection with Figure 2, wherein the oil is separated from the gluewater, after acidulation, prior to the separation of solids, is preferred.

It will be understood that the equipment described in connection with the drawings is for purposes of illustration, and that any other suitable equipment may be substituted. For instance, although simple evaporator equipment has been described, it will be understood that any other type may be employed, such as multiple effect evaporating equipment. In connection with the latter, it is sometimes preferred to have the gluewater flow through the evaporating stages in a reverse direction, that is in the direction of increasing temperature, the gluewater being first fed into the stage of lowest temperature.

Other variations will occur to persons skilled in the art upon becoming familiar herewith. Accordingly, it is to be understood that the above particular description is by way of illustration and not of limitation, and that changes, omissions, additions, substitutions and/or modifications may be made without departing from the spirit of the invention. Accordingly, it is intended that the patent shall cover, by suitable expression in the claims, whatever features of patentable novelty reside in the invention.

I claim:

1. A process for treating whale gluewater resulting from the cooking of whale solids in the presence of water which comprises adding to said gluewater an acidic material in amount sufficient to reduce the pH of said gluewater to within the range of from 4 to 5 while maintaining the temperature of said gluewater above 180° F. but below boiling, holding said treated gluewater substantially static for a period of at least 15 minutes, and thereafter separating undissolved solids and liberated oil from said gluewater.

2. The process of claim 1 in which the pH range is from 4 to 4.5.

3. The process of claim 2 in which the pH is maintained substantially at 4.2.

4. The process of claim 1 in which the acidic material is sulfuric acid.

5. The process of claim 4 in which the pH of the gluewater is maintained substantially at 4.2.

6. The process of claim 3 in which the treated gluewater after separation of undissolved solids and liberated oil is subjected to vacuum evaporation to produce a concentrated product.

7. The process of claim 1 in which the gluewater from the time of its production through the time of pH adjustment is maintained at a temperature above 180° F.

8. The process of claim 7 in which a temperature above 180° F. is continued during the separation of solids and oil.

9. The process of claim 1 in which the static period is at least approximately 30 minutes.

10. The product of the process of claim 6.

11. The product of the process of claim 3.

WALTER C. DAVIS.

REFERENCES CITED

The following references are of record in the file of this patent:

UNITED STATES PATENTS

| Number | Name | Date |
| --- | --- | --- |
| 353,824 | Sahlstrom | Dec. 7, 1886 |
| 489,010 | Joslin | Jan. 3, 1893 |
| 2,204,703 | Sanders | June 18, 1940 |